United States Patent [19]

Stone, Jr.

[11] Patent Number: 4,611,125
[45] Date of Patent: Sep. 9, 1986

[54] POWER POTENTIATING WINDMILL

[76] Inventor: Paul R. Stone, Jr., 1901 Huber Rd., Charleston, W. Va. 25314

[21] Appl. No.: 575,410

[22] Filed: Jan. 31, 1984

[51] Int. Cl.⁴ .............................................. F03D 1/06
[52] U.S. Cl. ...................................... 290/55; 290/44; 416/9; 416/DIG. 2
[58] Field of Search ....................... 290/44, 55; 415/2; 416/9

[56] References Cited

U.S. PATENT DOCUMENTS

| | | | |
|---|---|---|---|
| 4,115,027 | 9/1978 | Thomas | 290/55 |
| 4,415,813 | 11/1983 | Carme | 290/44 |

OTHER PUBLICATIONS

Lindsley, *Wind Power*, 7-1974, p. 54 (Popular Science).
Scott, *One-Armed Monster*, 1-1981 (Popular Science).

Primary Examiner—William M. Shoop, Jr.
Assistant Examiner—W. E. Duncanson, Jr.

[57] ABSTRACT

An apparatus is disclosed for taking advantage of the Bernoulli Principle for moving an airfoil, the airfoil being mounted on a collar for rotation about an axle when in a moving fluid medium. The axle is slanted at a backward angle in the fluid medium direction in a manner so as to permit the motion of the fluid medium to exert a substantially continuing lift force on the top of the airfoil blade adjacent to its leading edge to take advantage of the Bernoulli Principle for a portion of the blade arc, and, for other portions of the arc of rotation, so as to permit the force of the fluid medium to exert rotational force on the bottom of the airfoil blade.

16 Claims, 6 Drawing Figures

POWER POTENTIATING WINDMILL

This invention has resulted from a long period of study, and experimentation with airfoil sections, principally as such may relate to the construction of efficiently-operating windmills, although the invention may be used in any fluid medium. The well-known aerodynamic effect, the "Bernoulli Principle," is regarded as the basic underlying force of most of the lift of a typical airplane wing; also, when an aerodynamic airfoil section assumes a positive "angle of attack" (angle of the bottom of airfoil, by projecting outward a straight line along the chord (i.e., width of the airfoil), made with the direction of the relative wind) a resulting forward-acting factor, or moment, is also induced. It is the latter, one of the vector components of the net lift force acting along the top of the wing or airfoil (with its lower pressure, due to the Bernoulli principle), which provided me with the idea underlying this invention. This forward-acting moment of force, I felt, could be effectively harnessed for the efficient production of power, in a manner decidedly different from the force from the wind which the typical windmill of today utilizes (the latter seem to exclusively use the so-called "flat-plate" effect for rotation); one phase of my own invention here described, however, also utilizes, in part, this same flat plate effect—but only incidentally, in the "downwind" cycle of rotation.

To those skilled in the art, the Bernoulli Principle works to create about two-thirds of the lift of the typical airplane wing. The principle teaches that the pressure which a fluid exerts is inversely proportional to its velocity. The air travelling over the top (more pronounced curved portion) of the airplane wing has a longer distance to travel to arrive at the trailing (back) edge of the wing than does the underside (more nearly flat) portion of the wing; hence, the effect created is one of pressure differential whereby the wing is pushed/- pulled upward by the great pressure on the underside\* of the wing (plus, a "flat plate" effect on the underside is also operable, but those skilled in the art know that such provides only about one-third (a considerably lower) portion of the net lift). The "flat plate" effect is best defined, perhaps, as "brute force" acting directly against a flat, or partially curved, plane wing's underside.

\*And lower pressure on top

The typical windmill of today, no matter how streamlined, or curved (even to the extent of being airfoil-like) does not utilize the Bernoulli Principle, to the best of my knowledge—from extensive study of various contemporary windmill designs; the streamlined portion is for the purpose of affording less "drag" (i.e., blade resistance, or friction).

My blade element has its leading edge actually advancing in the general direction, somewhat obliquely, into the wind (or other fluid medium); this may seem incredulous to many, but I have successfully demonstrated it in my invention. Of course, the Bernoulli Principle itself may seem incredulous—and somewhat seemingly contrary to our so-called "common sense". Who would ever believe that blowing one's breath across the top part of a piece of paper held horizontally in one's hand, would cause the paper to rise? The opposite would seem more logical, if we relied solely on "common sense". But such is the result (Bernoulli's discovery) of this marvelous effect. Sailboats are able to obliquely travel into the wind, the most efficient angle of upwind "tacking", however, being about 45 (forty-five) degrees into the wind. In FIG. 1, the airfoil 1, encounters the wind W at a positive angle of attack 2, resulting in net lift/forward moment resultant R. In FIG. 2, the optimal angle of the axle 3 with the horizontal H, of 45 degrees 4, permits the effective incidence angle 5. Ice-boats (ice-sleds), with sail power, may actually go much faster than the speed of the prevailing wind which impels them; again, this anomalous effect is due to the principle which Bernoulli (the Swiss mathematician) discovered centuries ago! The above incidence angle 5 (& concomitant blade attack angle) has such purpose.

In addition to my trying to utilize the effect of the forward motion component of the airfoil section, with a positive angle of attack, I also have made an attempt herein to capitalize on the same effect noted in reference to the ice-boat traveling (across an icy lake) faster than the wind speed which it depends on for all of its impelling force. The principle underlying the latter also comprises one well-known to those skilled in aerodynamic art, viz., that the amount of lift (in the case here at hand, the net forward-acting component, or vector, of such "lift") varies directly proportionally to the square of the velocity of the relative wind. Hence, the sail-powered ice-boat's speed increases in a somewhat geometrical manner . . . the faster the ice-boat is impelled forward into the wind (obliquely), the more and more the "squared" velocity of the wind further impels it on (up to a point, that is).

One of the features on which my invention depends is to make certain that it is constructed in a manner (i.e., designed) so as to make efficient use of the Bernoulli Principle, and the geometrically-potentiating effect of the ever-enhancing speed of rotation, as the blades (airfoil elements) travel generally into (but oblique to) the wind (i.e., somewhat opposite to the direction of the wind) during one phase of rotation of each blade element.

This is accomplished simply by so positioning the airfoil element about an axis of rotation in such a manner that its angle of incidence (i.e., with the axis (or "axle", if one prefers)) ultimately permits a positive angle of attack having a range of, generally, or gamut of, 2 (two) or 15 (fifteen) degrees with the prevailing direction of the wind (or other fluid medium—within the scope of this invention, also).

This is accomplished by a design which comprises two\*or more airfoil blades mounted perpendicularly to an axle (axis), i.e., in a plane normal to such axle, and also arranged in a symmetrical fashion (looking down on the device from above). Each blade, however (looking from the side, i.e., obliquely at its "cross-section") has a variable positioning means, such as a dowel at its root end, mountable in a socket (attached securely to the axle) for an angle of incidence with the axle, varying in such a manner as to effect a net angle of attack with the direction of the prevailing wind (or other medium) of a gamut from 2 (two) degrees to 15 (fifteen) degrees (angles of attack) with the relative wind. This is efficiently accomplished in my device by positioning the axle itself at an angle away from (i.e., "downward") of the advancing wind (or other medium) direction; in my preferred embodiment, discussed and described later herein, this angle of the axle "downwind" is an acute angle of 45 (forty-five) degrees. Such backward-slanting angle\*\*(axle) thus permits the airfoil blades to be mounted in a fashion that the upward (i.e., forward-acting) moment or vector of force on the topside of each blade (nearest the leading edge thereof) is more nearly perpendicular to the axle itself (that is, optimally acting, as near as possible within the limitations of this device, to impart rotational thrust around the axle as close to a 90 (ninety) degree angle with such axle as is possible). See FIG. 2, Sheet 1, of the attached Drawings, for further exposition of the resulting beneficial effect of such configuration on efficient rotation of the airfoil blade(s). My preferred embodiment, however, involves positioning the airfoil blades on a sleeve, or collar, which latter annularly revolves around the axle.

*One blade only may be used; see Sheet 4, FIG. 5, with shaft 8, & counterbalance 15, with variable 16 means on extended dowel shaft 8, diametrically opposite the blade, for positioning the counterbalance.
**Alternatively, it could have been labelled a corollary 135 degree obtuse angle.

In addition to FIG. 6, infra, a side view, the most comprehensive view of all, and for a brief summary of other drawing views, FIGS. 1 and 2 are the airfoil leading edge areas with pos angle of attack 10° (made possible by the axle angle of incidence, noted in FIG. 2, of 55° ).

FIG. 4 and FIG. 3 thus support claims 1 and 2, infra.

Figure 1:
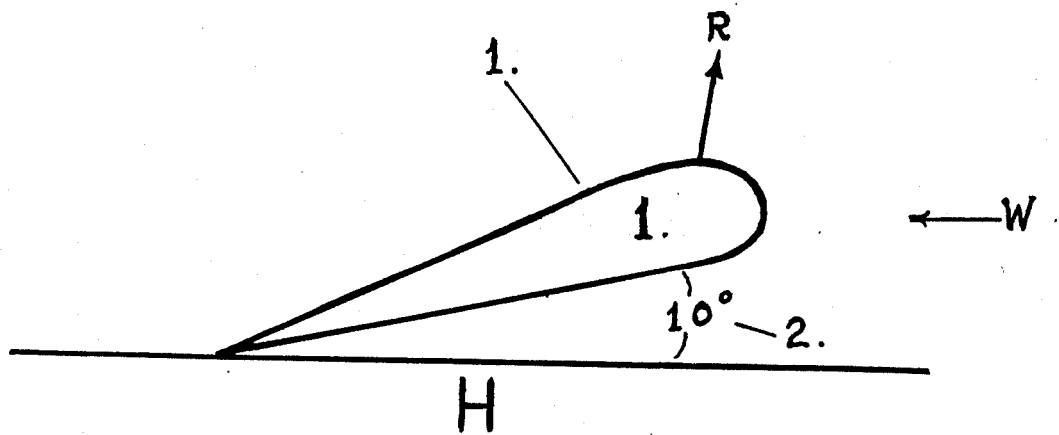
Figure 2:
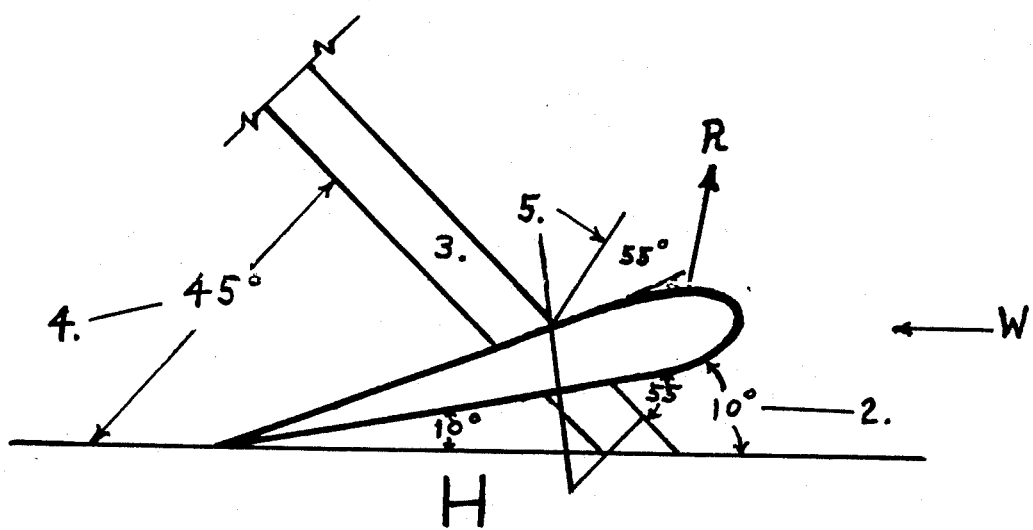

In my preferred embodiment, one adjusts each blade (which, as noted, has suitable means for changing its angle of incidence, with resulting change in angle of attack with the wind) so as to secure a 10 (ten) degree angle of attack with the prevailing wind direction. This is accomplished by giving each blade—already positioned above an axis slanting 45 degrees away from ("downwind") the wind—a 55 (fifty-five) degree acute angle of incidence, measuring from the lower portion of the axle (i.e., that portion below the blade element). See FIG. 2, Sheet 1, of the Drawings.

The axle of my invention should be preferably of metal construction, such as steel, aluminum alloy, etc., as it needs to withstand shear stresses and other assaults on structural integrity, and also needs rigidity. The airfoil blade elements may also be of suitable metal (such as steel, or aluminum alloy, etc.), but could alternatively be of bonded wood or plastic construction, fibreglass, etc. The dowel, affixed to the root end of the blade element, perpendicular to the cross-section of such element, and placed about one-third the distance of the chord (width) line of the foil section aft of the leading edge thereof, may be of metal or other construction—such must be compatible with the material of which the airfoil is made, however (i.e., metal to metal; wood to wood; or metal dowel suitably attached to a wooden or fibreglass wing (airfoil) section, etc.). The socket element—in which the dowel is seated securely—may, and preferably should be, made of suitable metal (steel, aluminum alloy, etc.), because the socket means is itself securely attached (by welding, epoxy bonding, etc.) to the axle collar. Clamping means, consisting of a movable bolt, with screw threads thereon, and corresponding inside "threading" in the socket element, or other suitable means of attachment may be used. The screw clamps are used in my preferred mode. See FIG. 3, Sheet 2, on which is noted the collar 6, the socket 7, the dowel 8, and the clamping means 9 (clamp, or, e.g., bolt), used to variably position the blades. (My preferred embodiment utilizes two airfoil-type blades, secured to collar 6).

The blade (airfoils) may be of uniform cross-section for the entire length of the span; or, such could be "twisted" (as is an aircraft propeller—another type of airfoil blade), or they could be tapered. In my preferred embodiment, I taper them, with the larger dimension of width at the root end tapering down to 50 (fifty) percent of the root width at the tip area of the blade, all of such tapering, however, being done starting with the trailing edge of the root of the airfoil with the diminution being along the trailing edge alone; this is for the purpose of assuring that the leading edge of the airfoil blade is perpendicular to the wind (or other fluid medium) throughout the entire length of the span. Leaving the leading edge thus intact, in respect to its "upwind" portion of motion of rotation, so that it always presents (±90 deg.) its entire span to the wind (rather than being a "sweptback" wing element, as are used in supersonic aircraft), has been found to be the more efficient for sub-sonic airfoil blade elements (such as is utilized in the instant invention). The publication by Time, Incorporated, entitled "*Flight*", by authors Stever and Haggarty, notes the increased efficiency of placing subsonic blade airfoil elements with their leading edges more nearly perpendicular to the prevailing relative wind (pp. 59–61 of such treatise). The reason for taperng, in the first instance, is to more nearly equalize the varying thrust moments which are different depending on how far along the span a particular blade portion happens to be (i.e., it varies as the radius from the hub, or root, varies). "Twisting" the blade element is largely for the same purpose. Also, an alternative means of practicing this invention would be to use blade elements from standard light airplane propellors, such as Sensenich 74CK-0-44 design, etc. In such case, the blade element, from this or some other similar light aircraft propeller, is severed at the point where its hub begins (i.e., adjacent where the plane engine crankshaft inserts into the mid-portion of the two-bladed propeller) by metal saw, cutting torch, etc., its root suitably fitted (by welding, etc.) with a metal dowel about mid-way, or middle portion of its root, and each such blade element (so re-fashioned) then insertable in the same type of socket means previously-described, supra. The blade elements in such case should then be empirically adjusted as to their angle of incidence (which, with respect to each, should of course be uniform—once the optimal blade angle is determined); such empirical adjustment of the angle of incidence is necessary, because of the varying (built-in) angles of pitch along the entire span of the typical propeller blade.

In my preferred embodiment, however, I use the standard "Clark-Y" airfoil (cross-section) blade, well-known in the art as perhaps the most famous of all aircraft cross-section blade designs. It has a flat bottom portion; hence, its bottom section is practically a uniform plane, permitting easy measurement in setting the appropriate angle of incidence (so as to achieve an appropriate angle of attack with the wind or other fluid medium, viz., a 10 (ten) degree angle of attack in my preferred mode). It has sufficient thickness, and curvature atop its leading edge, so as to achieve a high degree of lift/forward moment effectiveness, and it is an easy section to construct. It is also believed that any other aerodynamic airfoil blade element may be appropriately used in this invention, including those with a concave bottom.

Figure 3:
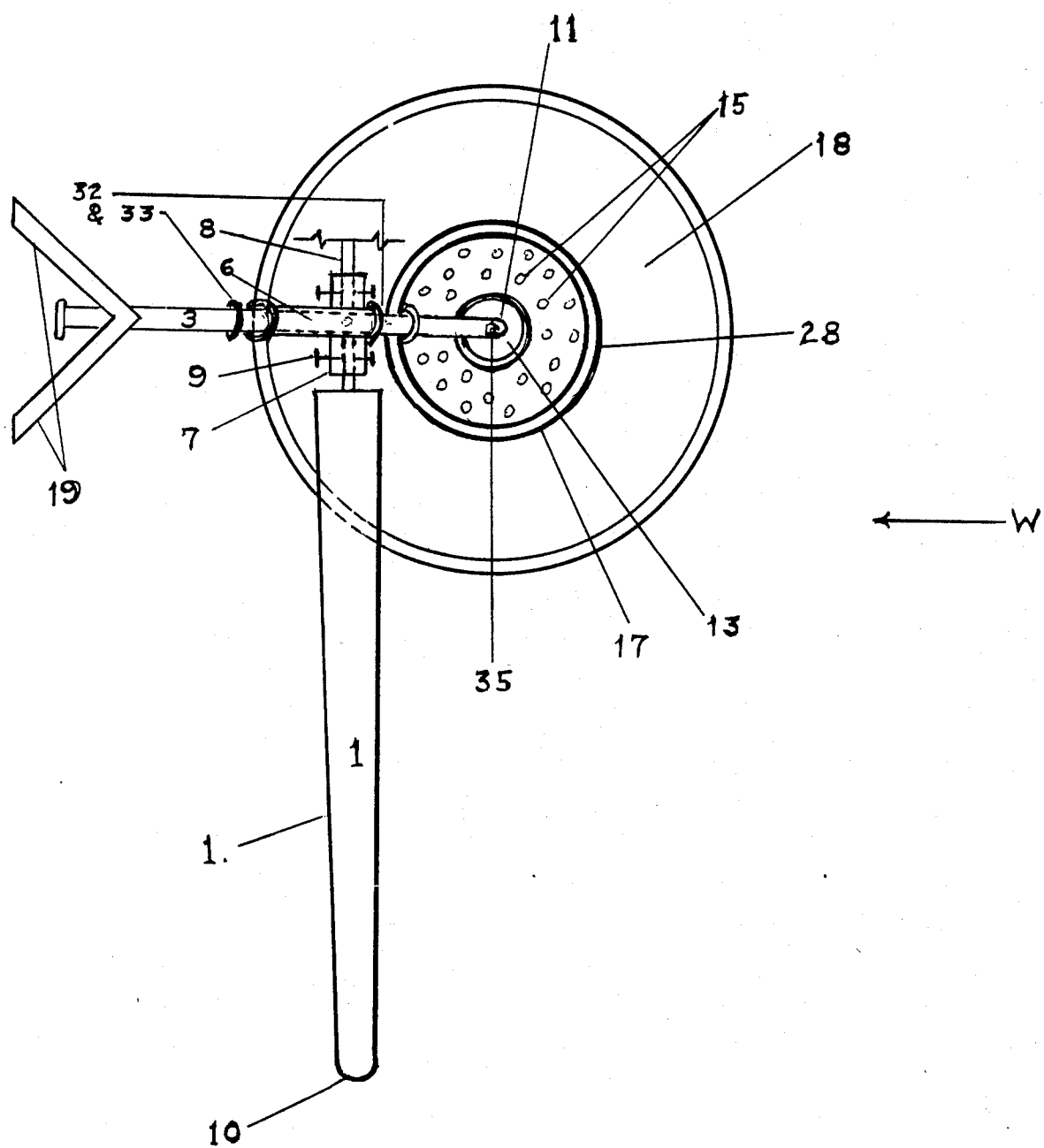
FIG. 3 is a top view of the device, giving details of its machine part operative elements.

It is well-known that a flat airfoil blade tip has a propensity for developing deleterious vortices about such tip; as an optimum matter, it has been found—in sub-sonic aerodynamic teaching—that an elliptical tip element more nearly obviates such undesirable tip vortex action. Thus, the invention could use a suitable elliptical-shaped tip; however, a semi-circular cross-section is also useful in alleviating tip vortices and, in my preferred mode, this is what is used. It has the advantage of being easily plotted, and hence less subject to error, in its construction (its net vortex-obviating effect is not much less than the elliptical element, it is also noted). In FIG. 3 (Sheet 2, Drawings), see the semi-circular tip 10.

This apparatus, of course, must be positioned in an appropriate base or housing in order to maintain the integrity of its most efficient configuration. I have chosen, in a preferred embodiment thereof, to have the bottom of the axle "flared out" by compression of its annular sides into a flat bottom (11, in FIG. 3) portion of a few inches in length (by using a heating means thereon and hammering it, or otherwise compressing its sides into a flat shape), in which a hole is placed (35, FIG. 3), the flat portion then bent outwardly to an angle of 135 degrees (preferred mode), or other axle angle (if another is chosen in lieu of the 45 degree incidence). A metal plate (FIG. 3, at 13) is provided a hole, bolt, and flat washers, and the bottom portion of the axle inserted contiguous to the top of such plate, but in a manner so that the axle is able to freely rotate throughout a full 360 (three-hundred sixty) degrees. For bracing the side of the axle at a point higher up on its length, a suitable means, such as an annular ring (attached by bracing elements or legs, to the ground, or other base) may be used. Also, a cement or other suitable ceramic-dome shaped base may be used, within its upper center portion being provided with a hollow conical section, with opposite sides having twice the desired angle of backward "slant" of the axle from the wind (if in my preferred mode, of course, such would have diametrically opposite sides of the conical section in an angle of 90 (ninety) degrees with each other, so as to effect a constant 45 degree slant of the axis at all times as it moves annularly inside such inverted hollow cone), such axle positioned in a hollow "collar" or sleeve through which the axle is inserted, with dimensions longer than the side length of such cone, the diameter inside the collar or sleeve being slightly larger than the outside diameter of the axle to permit easy rotation of the axle inside such sleeve means (the latter being positioned by a suitable projection (e.g., disc, nipple, or otherwise) slightly above and below its length, which projection is located securely on the axle itself. (The same types of projections can be used to position the collar or sleeve on which the airfoil blade elements are positioned . . . perhaps of more sturdy construction—as such actually have to support the weight of the blades, etc.)

In my preferred embodiment, however, of the base structure in which the axle is located, I utilize a hollow cylinder, preferably of metal construction (such as a length of sewer or other metal culvert pipe, of large inside diameter). This can be inexpensively procured, and is relatively easy to work with, although other materials (even wood) could be used. The metal hollow cylindrical means may be suitably fitted with a metal base (round in shape), on which the metal plate, noted supra, will be fitted ot provide securing means (by use of the metal bolt, and washers) to position the axle, but to permit free movement of the axle in a 360 degree arc, contiguous to the inside (rim) portion of the hollow cylinder. At the point where the axle would otherwise touch the inside top rim of the cylinder, the preferred mode of my invention utilizes a pulley having an inside shape (looking at it edgewise) of a "U" (or, letter "V", preferably with the sides of the "V" fashioned in an obtuse (100+degree) angle), so as to engage the inside of the rim of the hollow cylinder at its top edge, with minimum of friction. The pulley is loosely fastened annularly, but having projecting positioning means, on the axle, it should be noted. Thus, the axle system—while it does not revolve in the usual fashion of a typical freely-moving axle (or crankshaft), does move in a potential 360 degree gamut, making a sweep substantially identical to the situation whereby its sides are adjacent the inner sides of a hollow cone and moving annularly therewith (its upper length, i.e., outside the cylinder, tracing an imaginary conical path of larger dimensions (again, inverted) above the cylindrical base which provides its support). The metal circular bottom of the hollow cylindrical base is attached either by welding its edges securely to the inside rim of the cylinder, or attaching same by angular metal strips and screw means. (In any event, the metal circular bottom should be sufficiently "grommeted" by drilling drain holes therein, to permit expulsion of any accumulating water, or other corrosive substance.) See FIG. 3 Sheet 2, the cylindrical base 17, the circular bottom (& grommets) 15, and small plate 13. As it has been found that there is also a fluid medium potentiating effect by use of ducting, or shrouding means, the base (whether ceramic, wood, metal, or whatever, including the hollow preferred cylindrical design mode) could be augmented, or additionally fashioned, in a manner that its outside periphery has an elliptical, or semi-circular annular shape, thus providing a sort of duct (or semi-Venturi) to direct and speed up the ambient air or other fluid flow in a manner beneficial to the operation of the rotating blade system. In my preferred embodiment, I enshroud the hollow cylinder with an elliptical 18 duct design along the entire periphery of the outside of the cylinder. I use a thick sheet of aluminum (to withstand corrosion from the weather, etc.), cut in a fashion so that its sides are at the top of the cylinder throughout the entire circumference of its rim (curving downward to rest on the ground, or otherwise to abut on a plane normal to the plane of the cylinder side).

Although my preferred embodiment is as noted above, and subsequently in the Drawings, etc., another mode of mounting the axle, or axles (if a double, single—or multiple-system of these airfoil blade systems is desired) would be to mount such axle(s) in a horizontal plane, suitably securely attached to a base or other relatively-rigid means (but which may permit varying the sideways angle of incidence of the axle(s)); in such case, however, there should be a backward slant of such axle(s), sideways and backward, with respect to the means on which such are mounted, so that an airfoil angle of attack (preferably 10 degrees) may be obtained in respect to the direction of the wind or other fluid medium. Such blades, as also noted hereinbefore, should be mounted on a collar or sleeve having suitable socket or other engaging means located annularly thereon, for the purpose of receiving doweled (or otherwise insertable) airfoil blade elements in a manner in which the angle of incidence (with concomitant angle of attack with the medium) will be variable. Mounting blades on a collar facilitates, thus, the angle-varying means.

The collar, on which the socket is securely mounted (by a weld, or by inside screws with countersunk heads, etc.) is preferably made of metal (e.g. steel, aluminum alloy). Annularly about such collar is securely mounted a pulley (or gear arrangement,if preferred),suitably connected to a similar device (e.g.,by a belt)mountd on a power utilizing means (here the preferred mode is an electric generator,securely mounted on the axle itself by bolts,a weld, or by clamps),to produce useful power.

For the purpose of always positioning the axle in a slanting direction "downwind" (preferable 45 degrees angle away from the wind), a tail is mounted at the top of the axle. This tail may be a single flat plate, with span approx. twice its width, or it could be a "V-shape" tal, the two edges thereof joined securely, with the resulting apex being mounted in a fashion directly abutting the axle. The construction of the tail, whether single, or V-shaped, could be wood, plastic, fibreglass or metal (preferable mode,I chose, is that of a V-shaped metal (aluminum, or steel,etc.) configuration, rigidly mounted, by appropriate bolt or screw means, or welded to the axle, i.e.,directly thereto).An alternative means is to affix a multiple plane tail, or V-tail (with its two sections joined at the edge, or apex) rigidly around a metal sleeve or collar, placed over the topmost part of the axle,each end of such collar being provided with suitable protrusions on the axle (above and below the collar) for keeping it in suitably-elevated position (so that the action of the tail will always keep the axle pointed "downwind",or with the advancing fluid medium).

In my preferred tail stabilizing mode, I use a V-shape comprising two flat plates, as indicated above, each with a span approx. one-third the span of of the airfoil blades themselves, with tail width being one-half its span; the two V tail plates are joined together in an angle of 90 (ninety) degrees,for maximum utilization of the prevailing wind to maintain the axle's constant 45 degree "downwind" position. The apex (where the two tail plate edges are joined together should) should be secured to the axle in such manner that it is pointing directly across the hollow cylinder at a point thereon directly across from the point where the axle's pulley touches the top edge of the rim of the hollow cylindrical base (i.e., an attitude such that a line drawn from the point the pulley touches the rim to the opposite side of the cylindrical base will be coextensive with the diameter of the cylindrical base.

At this juncture, a summary of the operation of this invention (FIG.6,Sheet 5) is stated thusly: As the prevailing wind (or other fluid medium) moves in a generally lateral direction across the Earth, its force acts upon the tail section 19, to position the axle 3 in a backward slanting angle of preferably 45 degrees ("downwind" with the advancing fluid medium). As noted, the axle is mounted in a base 17, with shrouding (duct,or semi-Venturi) 18 outside and abutting its periphery,such axle provided wih a pulley 34 loosely mounted rotatably about the axle, touching the top inner portion of the rim 20, to provide ease of annular movement of the axle (in a total potential gamut of 360 degrees). The advancing wind or other fluid medium W, encounters the leading edge of airfoil blade element 1, having "Clark-Y" airfoil cross-section design thus inducing--through a reaction (Bernoulli effect)--a lift and forward moment of force,such forward momen R acting in a direction which effectively imparts rotating force to the axle collar 6, on which a pulley 22 is located, connected by belt means 23 to another pulley 24 mounted on the crankshaft of an electric generator 25, such generator being rigidly secured to the axle itself by means of clamps 26 (through which bolts are inserted and secured by nuts) 27.

Thus, useful power is created by the action of this invention (Other means of a motive power nature, could also be utilized, it should be noted, in respect to the connection of the pulley and belt arrangement therewith.)

In the foregoing Specification pages, reference has been made to flat-plate effect, including a brief reference to the fact that the airfoil blade element in my invention—in its "retreating" phase (i.e., when the blade moves in the "downwinds" direction) with the ambient air or other fluid medium (even including water, for example)—receives, also, a fluid thrust benefit due to the brute force acting on the underside of the airfoil, impelling it backward (with the direction of the air or other fluid medium). This is another beneficial effect of my design configuration and, while the flat plate effect is old in the art of windmills or other fluid impellors, this effect is additionally made possible—for utilization in my device—due to the fact that an angle of attack (with the relative motion of the fluid medium) is always present in my invention as an innate feature thereof. Thus, it is seen that, while the advancing blade travels obliquely into the general wind (or other fluid) direction, with its leading (thicker) edge presented directly thereunto, in the retreating phase of the same blade (airfoil) element (going "downwind") such blade has its traling edge raised in its relation to the direction of the relative wind (or fluid), so that it makes beneficial use of the brute force (flat effect) on its underside as it travels "downwind" (in effect, there is also a positive "angle of attack" which the plane normal to the bottom of the blade makes with the relative wind (fluid) but in a retreating ("downwind") direction rather than upwind (or "attacking" the wind, or other fluid medium, e.g. water, etc.)

It is additionally noted that I place, on the Preferred Embodiment of my invention, a flanged upper rim 28 around the top circular edge portion of the cylindrical base). Such flange outside of the cylinder wall is given a curved downward slope, for the purpose of receiving under its surface a small wheel mounted on a "C-shaped" rigid piece of curved metal securely attached back of the axle just above the portion its outside annular protrusions are located (the latter for the purpose of preventing upward travel, to any appreciable extent, of the inside pulley mounted on the axle just inside the rim and resting on the edge thereof for rotation inside the cylinder). The purpose of the small wheel outside the cylinder, and resting under the flange (the wheel edges nested upward inside the rim curvature) is to make certain that the axle itself is securely positioned in a backward slant contiguous to the inside rim top edge at all times; there would be some propensity, if the wind were strong enough, or gusting irregularly, etc., for the reaction on the airfoil blade elements caused thereby to tend to raise the axle upwardly in a vertical—undesirable—position. The small, securing wheel 29, though free to rotate inside the outer curvature of the rim area, will prevent such unwanted upward travel of the axle.

Figure 6:
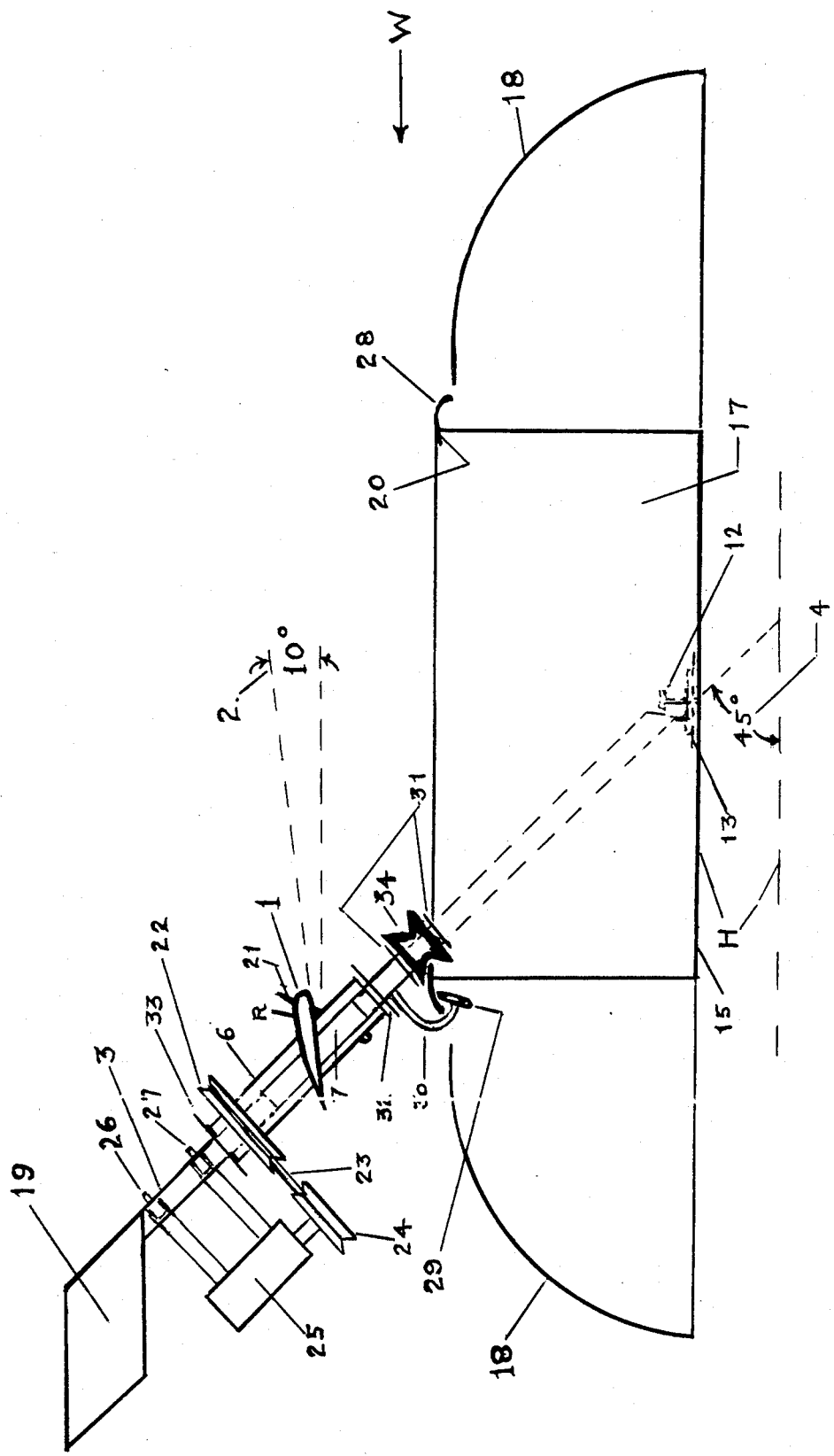

The inside annularly rotating pulley is designated by number 34, on FIG. 6 (on the outside periphery of the axle 3) and held in place (above and below) by protruding discs (nipple shaped, looking from the sides thereof) designated by the numeral 31. The "C-shaped" curved section (securely mounted at the back of the axle) 30, by welding preferably, has the small wheel 29, as previously noted, mounted on the periphery of the axle just under the inverted curved portion of the rim or flange, the latter designated by 28.

Figure 4:
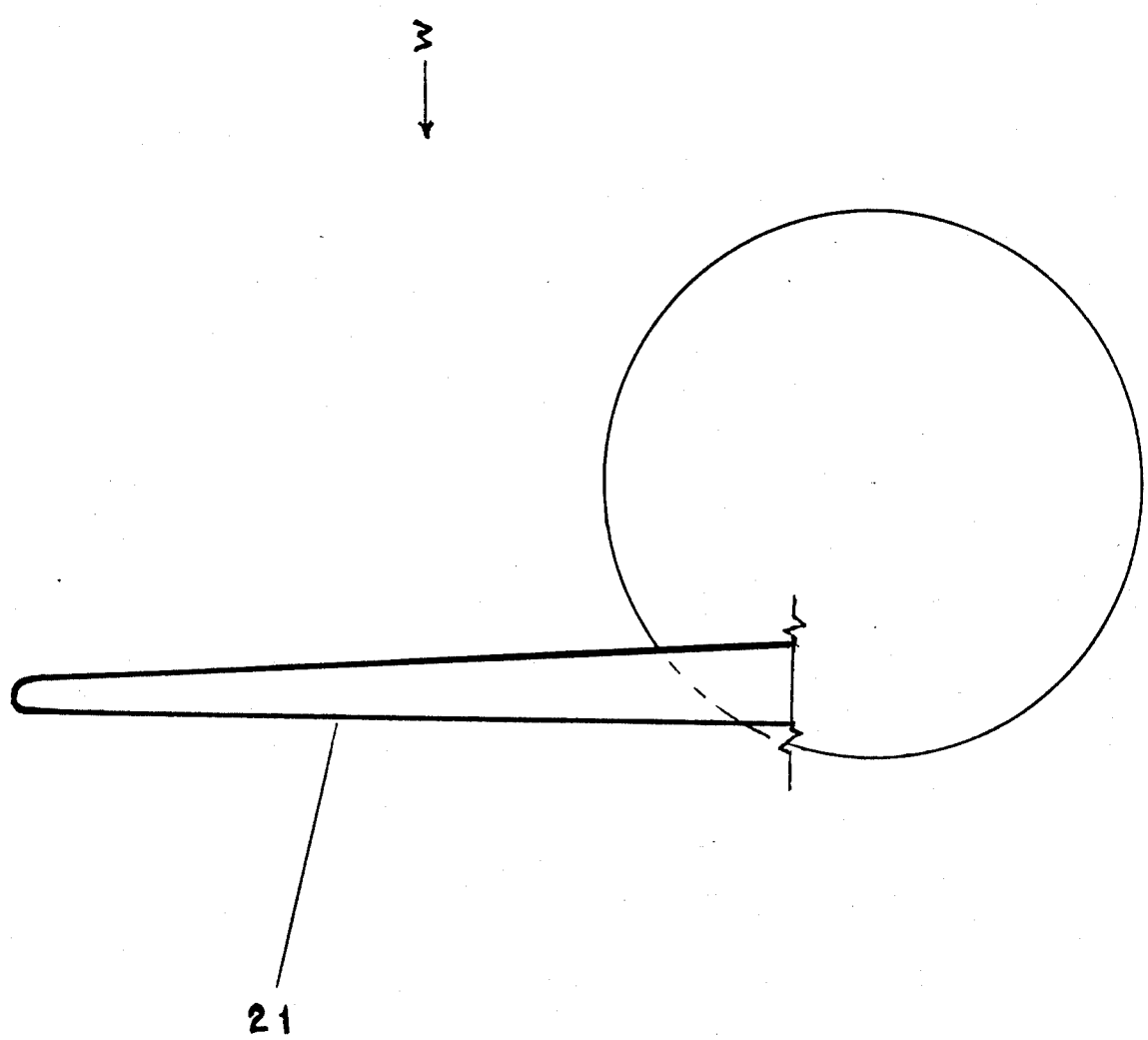
FIG. 4 is the second airfoil element, not specifically shown in FIG. 3 (to be superimposed over FIG. 3).
Figure 5:
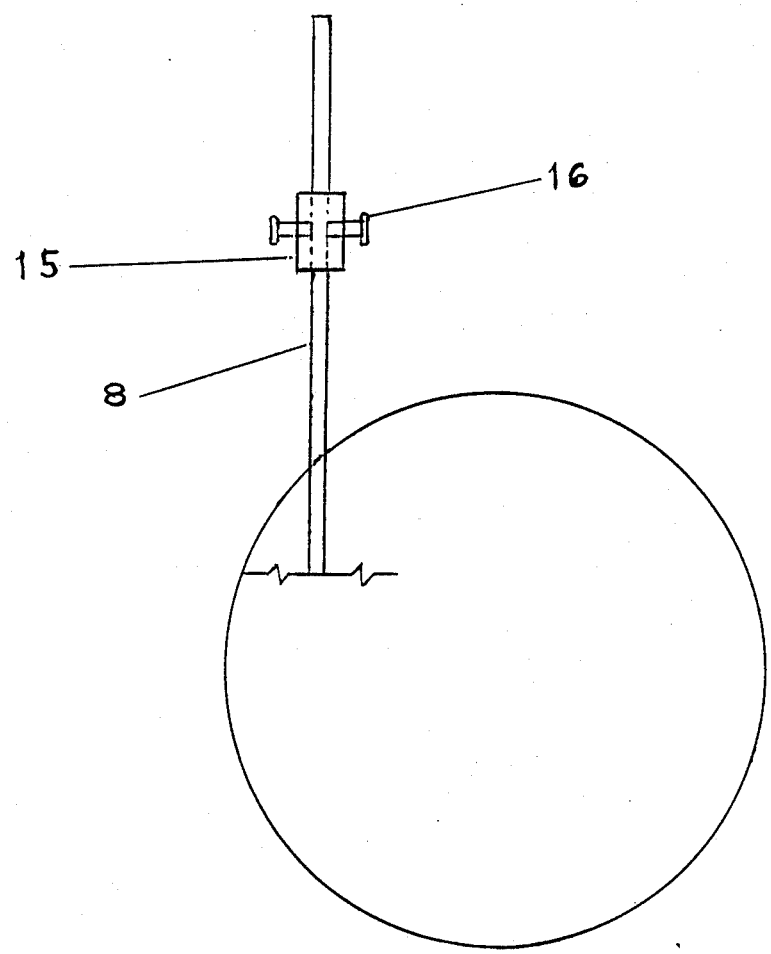
FIG. 5 is the means of counterbalance, with a weight 15 to balance the device when operating with only a single blade, to be also superimposed over FIG. 3.

In my drawings, I attempted to use a rough scale, whereby (approx.) 1 inch=3 feet. Also in my drawings, in order to reflect both a two (plurality) bladed airfoil configuration, I used sheet 2 (FIG. 3) over which sheet 3, FIG. 4 should be superimposed; and to reflect, claim 3 (a single blade only, with opposing counterweight diametrically opposite the single blade element) one should then superimpose, over sheet 2 (FIG. 3), the sheet on which such counterbalance, and extend dowel shaft "8", appears (viz. sheet 4, FIG. 5).

Consideration should also be given to the aspect ratio (the ratio of the span (length) of the airfoil blade element to its width (average chord), although some authorities state this as the ratio of the square of the blade's span to the area of the blade surface (from a top, or plan-form view).

In any event, the aspect ratio should generally not exceed 20 to 1 (for reasons of structural integrity of the blade), but in my preferred mode I have assigned the airfoil blade an aspect ratio of 10 (ten) to 1 (one), using a crude measurement of simply the length of the span in its relation to the chord width at its root (largest chord dimension, that is). The effect of the tapering on the square foot area of the planform (top) is disregarded by me, in ascertaining this "aspect ratio".

Of course, when one uses a standard aircraft propeller blade in practicing this invention, the aspect ratio is already pre-determined (with a possible need to change it, by alteration of the length of the inserted dowel elements, which otherwise could be made to protrude outwardly to a greater distance form the "root" of such blade to the point where such joins the axle (at its socket)). As stated previously, it is believed that such existing propeller blade designs as Sensenich 74CK-0-44 (T.C.1 P2, that is), are suitable for use herein, as also would be the TC918, PC3 McCauley Klip-Tip Design No. 1A101, etc. Also, it is envisaged that N.A.C.A. airfoil section numbers 4612 and 6409 (with a concavity on the undersides thereof), would be suitable for use herein, as would also be Goldberg design G-610 B, in addition to my prefeffed use of the famous "Clark-Y" airfoil section. It is, in effect, thus my belief that any aeronautical airfoil blade may be utilized in my invention, with perhaps the exception of those having a markedly-high convex underside, such as used in high-speed airplane wings, or for supersonic speeds. The latter is not here apropos. With aircraft wing angles of attack of 4 (four) and 15 (fifteen) degrees, respectively (with the relative wind), the markedly high upward and forward moments of thrust due to the reaction with the relative wind. At a 16 degree angle of attack, the effectiveness of the airfoil diminishes sharply (page 15 in such treatise).

It is also noted in the textbook, *Fluid Mechanics*, by R. C. Binder, 2nd Edition, 1949 (Prentice-Hall, New York City, publisher), at page 187, that, in effect, a 20 (twenty) degree angle of attack is counterproductive, insofar as any effect lift or thrust is concerned. Such, apparently, an angle of attack of 20 deg. would appear—in most circumstances of application—to be past the maximum angle at whichn effectiveness of net force could be secured from the wind, or other fluid medium.

It was with the foregoing considerations, borne firmly in mind, that I approached the problem of devising an effective device for optimal utilization of the forces in various fluid media (notably, air or the wind, but also including moving water and other fluids).

In summary, it is felt that again referring to the way my invention operates will be elucidating to the reader. Referrring to the Drawings, FIG. 6, Sheet 5, one sees that when the wind W is blowing from right to left, horizontally, it encounters the elliptical dome curved-shrouding, or duct 18 entirely surrounding the hollow cylinder 17 in which the axle 3 is housed. The effect and direction of the ambient wind is thus directed in a manner further potentiating the wind from a lower plane of reference toward the blade area (much as does an annular duct surrounding the "air cushion" type of aircraft, still somewhat experimental, but well-known to those versed in the art of aerodynamics), such duct—in effect—being a semi(half) Venturi, also taking advantage of the Bernoulli effect or principle.

As the ambient moving air impinges upon the airfoil blade 1, the effect on the upper leading edge area thereof brings the Bernoulli principle into operation, due to the angle of attack which such blade makes—due to the angle of incidence with the lower part of the axle, previously described, and to the backward ("downwind") angle in which the axle is place. Such blade 1 then advances forward, with its resulting velocity further multiplying the Bernoulli effect (as does a sail-equipped ice-boat "tacking" into, or moving sideways ("reaching") in the ambient wind). While blade 1 advances, its counterpart, i.e., the blade 21, on the opposite side of the axle, is in a "retreating"0 (or "downwind") phase, during parts of which rotation, it also makes beneficial use of the "flat plate" effect noted hereinbefore.

As the blades are rigidly secured around the axle collar 6, the resulting rotation creates a high amount of angular momentum. The collar 6 is provided with socket means 7 securely fastened thereto, in which the dowel element (from its secure attachment to the blade) inserts. See Sheet 2, FIG. 3, further depicting the collar 6, the socket means 7, and the bolting (clamping) means 9, the latter providing a means whereby the angle of incidence of the blades with the lower part of the axle may be varied, and thereafter secured for rotation. The axle is held, albeit loosely, by the lower bolt 12 (FIG. 6, Sheet 59 and by the curved "C" shaped positioning device 30 on which a wheel 29 is mounted for rotation about the lower portion thereof within the inverted flange curve 28 annularly located about the upper rim (of the cylindrical base) 20. The "C" shaped curved part, and the lower bolt, as described, thus hold the axle in a 45 degree slanting direction. To make certain that such slanting direction is always backward, or "downwind" with respect to the relative wind W, an upper stabilizing element comprising a "V" shaped tail 19 is provided (also on Sheet 5, FIG. 6), such V tail consisting of two parallogram-shapes approximately two inches in thickness, and whose effect length is approximately one-third of the span of a blade element, with the width being approx. one-half of such tail's length. Such serves to effectively utilize the oncoming wind, by transmitting such wind direction in a manner always securing the axle's "downwind" slant. The tail sections are rigidly secured to the top part of the axle, such sections —being preferably constructed of metal—being welded (preferably). Such axle, is potentially movable (by the portion thereof adjacent to the rim and flange) through an arc of 360 degrees, so as to always be capable of being positioned downwind, irrespective of the azimuth of the ambient wind, by the facilitating means of a pulley 34 (FIG. 6) revolvable about such axle and secured against undue upward and downward travel longitudinally with the axle by the securing means consisting of discs 31 preferably securely welded annularly about the axle just above and below such pulley. The pivoting means for the lower part of the axle comprises the bolt 12 (surrounded by the axle hole), around which the axle is freely rotatable just about the plate 13 at the bottom 15 of the cylindrical base.

The rotational moment of force, supplied to the collar by the blade/wind reactions, is transmitted to an electric generator by means of a pulley 22 securely attached (preferably by a welded joint) of the collar 6 and connected by a belt 23 to another pulley 24 mounted on such generator. The axle collar 6 is secured against undue upward travel, and prevented from downward travel—longitudinally, that is, with respect to the axle—by means of two annular rings 32,33 (or hollow discs) preferably welded about the axle and surrounding it an angle of 90 degrees with such axle, only a small fraction of an inch above and below the collar (so as to longitudinally secure same, but at the same time to permit free rotation of the collar around such axle). The generator is secured to the axle by clamping means 26 & 27.

Such embodiment, as above described, while preferred by me, is by no means the only effective vehicle whereby power generation can be optimally accomplished, by the transmitting of energy from an ambient moving fluid, through moving airfoil blades (moving about an axle). To those skilled in the art, effective utilization of the principles enunciated herein (including the Bernoulli effect, the squared fluid velocity effect, etc. ) can be done also by other means (suggested or implied herein, nevertheless), to those skilled in the art.

Wherefore, in view of the foregoing, I claim:

1. A method of taking advantage of the Bernoulli Principle to move airfoil means, comprising the steps of mounting airfoil means on collar means for rotation about axle means when disposed in a moving fluid medium, the direction of motion of the moving fluid defining a "fluid medium direction", said airfoil means comprising airfoil blade means having an aeronautical type cross section design and comprising at least one airfoil blade, the blade including a top and a bottom and leading and trailing edges, the airfoil blade means disposed within the moving fluid medium in a manner that the leading edge of the airfoil blade, during a portion of its rotation, advances opposite and at an angle of attack with respect to the fluid medium direction, the bottom of the airfoil blade and its trailing edge, during a portion of its rotation, moving cross-wise to the fluid medium direction, and during another portion of its rotation, the bottom, continuing to receive the force of motion of the fluid medium, moving with and in the fluid medium direction, the axle means being slanted at a backward angle in the fluid medium direction in a manner so as to permit the motion of the fluid medium to exert a substantial lift and continuing thrust reaction at the top of the airfoil adjacent to its leading edge to take advantage of the Bernoulli Principle for a portion of the blade arc, and for other portions of the arc of rotation, so as to permit the force of motion of the fluid medium to exert rotational force on the bottom of the airfoil blade, and connecting the airfoil blade means to means for providing power.

2. A method as in claim 1 further including disposing tailpiece means with respect to the axle means for allowing the force of motion of the moving fluid medium to impact with the tailpiece means to effect a constant backward positioning of the axle means in a plane parallel to that of the moving fluid direction.

3. A method as in claim 1 wherein said airfoil blade means comprises a plurality of blades.

4. A method as in claim 1 wherein the backward slant of the axle means is in the fluid medium direction, and is at an angle of approximately forty-five degrees from the horizontal.

5. A method as in claim 4 wherein the airfoil blade means rigidly secured to the collar means so as to effect an angle of attack of such blade means within a range of approximately two to fifteen degrees as such blade means advances in a direction opposite to that of the fluid medium direction.

6. A method as in claim 5 wherein the collar means is provided with variable positioning and locking means to permit varying the blade means so as to effect a fixed angle of attack within a range of two to ten degrees, wherein the airfoil blade means having an aeronautical cross section design comprises the "Clark-Y" cross section design, and wherein such airfoil blade means comprises a single blade with a diametrically-opposite counterweight balance.

7. Apparatus for taking advantage of the Bernoulli Principle to move airfoil means, comprising airfoil means, collar means and axle means, said airfoil means being mounted on the collar means for rotation about the axle means when the airfoil means is disposed in a moving fluid medium, the direction of motion of the moving fluid medium defining a "fluid medium direction", said airfoil means comprising airfoil blade means having an aeronautical type cross-section design and comprising at least one airfoil blade, the blade including a top and a bottom and leading and trailing edges, the airfoil blade means being disposed within the moving fluid medium in a manner that the leading edge of the airfoil blade, during a portion of its rotation, advances opposite to and at a angle of attack with respect to the fluid medium direction, the bottom of the airfoil blade and its trailing edge, during a portion of its rotation, moving cross-wise to the fluid medium direction, and during another portion of its rotation, the bottom, continuing to receive the force of motion of the fluid medium, moving with and in the fluid medium direction, the axle means being slanted at a backward angle in the fluid medium direction in a manner so as to permit the motion of the fluid medium to exert a substantially continuing lift force on the top of the airfoil blade adjacent to its leadng edge to take advantage of the Bernoulli Principle, and the effect thereof, for a portion of the blade arc, and, for other portions of the arc of rotation, so as to permit the force of motion of the fluid medium to exert rotational force on the bottom of the airfoil blade, and means connecting the airfoil and collar means to means for providing power.

8. Apparatus as in claim 7 further including tailpiece means disposed with respect to the axle means for allowing the force of the motion of the fluid medium to impact with the tailpiece means to effect the backward positioning of the axle means substantially constantly in a plane parallel to the fluid medium direction.

9. Apparatus as in claim 8 whereby the backward slanting axle is positioned within, and abutting against, a rigid hollow annular rim means.

10. Apparatus as in claim 7 wherein the said airfoil blade means comprises a plurality of blades.

11. Apparatus as in claim 10 wherein the moving fluid medium is a liquid.

12. Apparatus as in claim 7 whereby the means for providing power is an electric generator.

13. Apparatus as in claim 7 wherein the backward slant of the axle means is from approximately twenty-five to forty-five degrees from the horizontal, and the angle of attack of the blade means, as such blade means advances into the fluid medium and in a direction opposite the fluid medium direction, is within a range of two to fifteen degrees.

14. Apparatus as in claim 13 wherein the moving fluid medium is a liquid, and wherein is further provided a positioning means to rigidly secure the axle means at a backward slanting angle within a range of twenty-five to forty-five degrees from the horizontal, and wherein is further provided additional positioning means to rigidly secure the airfoil blade means at a fixed angle of attack within a range of two to fifteen degrees.

15. Apparatus as in claim 13 wherein the airfoil blade means comprises a single airfoil blade, and with an opposite counterweight balance means.

16. Apparatus for taking advantage of the Bernoulli Principle to move airfoil means, comprising airfoil means and axle means, said airfoil means being mounted on the axle means for co-extensive rotation therewith when the airfoil means is disposed in a moving fluid medium, the direction of motion of the moving fluid meium defining a "fluid medium direction", said airfoil means comprising airfoil blade means having an aeronautical type cross section design and comprising at least one airfoil blade, the blade including a top and a bottom and leading and trailing edges, the airfoil blade means being disposed within the moving fluid medium in a manner that the leading edge of the airfoil blade, during a portion of its rotation, advances opposite to and at an angle of attack with respect to the fluid medium direction, said angle of attack being within a range of two to fifteen degrees, the bottom of the airfoil blade and its trailing edge, during a portion of its rotation, moving cross-wise to the fluid medium direction, and during another portion of its rotation, the bottom, continuing to receive the force of motion of the fluid medium, moves with and in the fluid medium direction, the axle means being slanted in a fixed backward angle, within a range of twenty-five to forty-five degrees, in the fluid medium direction in a manner so as to permit the motion of the fluid medium to exert a substantially continuing lift force on the top of the airfoil blade means adjacent to its leading edge to take advantage of the Bernoulli Principle, for a portion of the blade arc, and for other portions of the arc of rotation, so as to permit the force of motion of the fluid medium to exert rotational force on the bottom of the airfoil blade, and means connecting the airfoil and axle means to means for providing power.

* * * * *